(12) United States Patent
Nie et al.

(10) Patent No.: US 11,767,232 B2
(45) Date of Patent: Sep. 26, 2023

(54) PROCESS AND DEVICE FOR CONTINUOUS TREATMENT OF HIGH-CONCENTRATION ORGANIC WASTEWATER

(71) Applicant: ZHEJIANG UNIVERSITY OF TECHNOLOGY, Zhejiang (CN)

(72) Inventors: Yong Nie, Zhejiang (CN); Shangzhi Yu, Zhejiang (CN); Xiaojiang Liang, Zhejiang (CN); Qinglong Xie, Zhejiang (CN); Zhenyu Wu, Zhejiang (CN); Jianfeng Bai, Zhejiang (CN)

(73) Assignee: ZHEJIANG UNIVERSITY OF TECHNOLOGY, Zhejiang (CN)

( * ) Notice: Subject to any disclaimer, the term of this patent is extended or adjusted under 35 U.S.C. 154(b) by 273 days.

(21) Appl. No.: 17/367,642

(22) Filed: Jul. 6, 2021

(65) Prior Publication Data

US 2021/0331943 A1 Oct. 28, 2021

Related U.S. Application Data

(63) Continuation of application No. PCT/CN2020/134918, filed on Dec. 9, 2020.

(30) Foreign Application Priority Data

Dec. 25, 2019 (CN) .............................. 201911358921

(51) Int. Cl.
*C02F 1/04* (2023.01)
*B01D 53/48* (2006.01)
(Continued)

(52) U.S. Cl.
CPC .............. *C02F 1/048* (2013.01); *B01D 53/48* (2013.01); *B01D 53/81* (2013.01); *B01D 53/96* (2013.01);
(Continued)

(58) Field of Classification Search
CPC .. C02F 1/043; C02F 1/048; C02F 1/16; C02F 2103/365; C02F 2209/08; B01D 53/48;
(Continued)

(56) References Cited

U.S. PATENT DOCUMENTS

2019/0145310 A1 5/2019 Hwang

FOREIGN PATENT DOCUMENTS

| CN | 102503031 | 6/2012 |
| CN | 102557321 | 7/2012 |

(Continued)

OTHER PUBLICATIONS

SEARCH Machine Translation of CN-109336200-A obtained May 31, 2023. (Year: 2023).*

(Continued)

*Primary Examiner* — Jonathan Miller
(74) *Attorney, Agent, or Firm* — JCIPRNET

(57) ABSTRACT

The present invention provides a process for continuous treatment of high-concentration organic wastewater and a device for continuous treatment of high-concentration organic wastewater. The process of the present application is that: high-concentration organic wastewater is continuously separated through the synergistic interaction of a multilayer evaporator and a heat pump, and the generated wastewater steam containing light components is continuously subjected to desulfurization and catalytic combustion after being mixed with air in a gaseous form, the treated wastewater can meet discharge standards, and heavy components of the generated wastewater can be recycled. After the desulfurizing agent in a first desulfurizer and the catalyst in a first catalytic combustor are deactivated, the generated wastewater steam containing the light components can be switched to a second desulfurizer and a second catalytic combustor for reaction, and air can be introduced into the (Continued)

deactivated catalyst and desulfurizing agent for in-situ regeneration at a high temperature.

9 Claims, 1 Drawing Sheet

(51) Int. Cl.
| | | |
|---|---|---|
| *B01D 53/81* | (2006.01) | |
| *B01D 53/96* | (2006.01) | |
| *B01J 23/96* | (2006.01) | |
| *B01J 38/12* | (2006.01) | |
| *C02F 1/16* | (2023.01) | |
| *F23G 7/07* | (2006.01) | |
| *C02F 101/10* | (2006.01) | |
| *C02F 101/30* | (2006.01) | |
| *C02F 103/36* | (2006.01) | |

(52) U.S. Cl.
CPC ............... *B01J 23/96* (2013.01); *B01J 38/12* (2013.01); *C02F 1/043* (2013.01); *C02F 1/16* (2013.01); *F23G 7/07* (2013.01); *B01D 2251/602* (2013.01); *B01D 2255/1021* (2013.01); *B01D 2257/30* (2013.01); *C02F 2101/101* (2013.01); *C02F 2101/30* (2013.01); *C02F 2103/365* (2013.01); *C02F 2209/03* (2013.01); *C02F 2209/08* (2013.01)

(58) Field of Classification Search
CPC .......... B01D 53/81; B01D 53/96; B01J 23/96; B01J 38/12; F23G 7/07
See application file for complete search history.

(56) References Cited

FOREIGN PATENT DOCUMENTS

| | | | | |
|---|---|---|---|---|
| CN | 102389789 | | 4/2013 | |
| CN | 102533309 | | 5/2014 | |
| CN | 103045298 | | 3/2016 | |
| CN | 107098415 | | 8/2017 | |
| CN | 105126573 | | 10/2017 | |
| CN | 107381698 A | * | 11/2017 | .............. C02F 1/043 |
| CN | 107857321 A | * | 3/2018 | .............. C02F 1/043 |
| CN | 109019730 | | 12/2018 | |
| CN | 109336200 A | * | 2/2019 | ................ C02F 1/04 |
| CN | 106348371 | | 4/2019 | |
| CN | 109943375 | | 6/2019 | |
| CN | 106582272 | | 11/2019 | |
| CN | 108910829 | | 5/2020 | |
| CN | 108570335 | | 7/2020 | |
| CN | 107531481 | | 9/2020 | |
| CN | 110937648 | | 3/2021 | |
| DE | 3236787 | | 8/1984 | |
| JP | 2007260538 | | 10/2007 | |
| WO | 2016170000 | | 10/2016 | |
| WO | 2018053526 | | 3/2018 | |

OTHER PUBLICATIONS

SEARCH Machine Translation of CN-107857321-A obtained May 31, 2023. (Year: 2023).*
SEARCH Machine Translation of CN-107381698-A obtained May 31, 2023. (Year: 2023).*
Qinglong Xie, et al., "High vacuum distillation for low-sulfur biodiesel production: From laboratory to large scale", Journal of Cleaner Production, No. 223, Mar. 14, 2019, pp. 379-385.

* cited by examiner

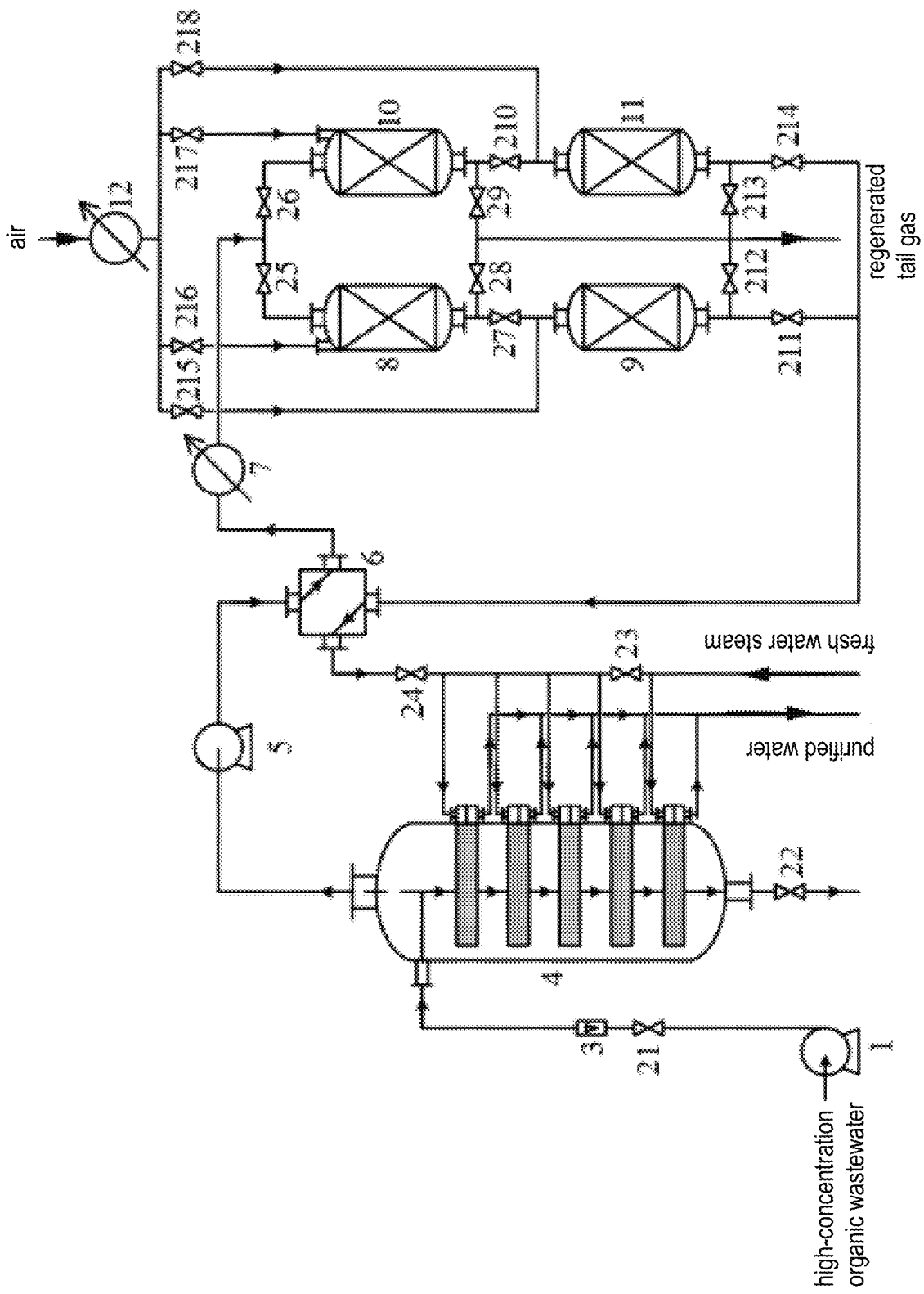

PROCESS AND DEVICE FOR CONTINUOUS TREATMENT OF HIGH-CONCENTRATION ORGANIC WASTEWATER

CROSS-REFERENCE TO RELATED APPLICATION

This application is a continuation of international application of PCT application serial no. PCT/CN2020/134918, filed on Dec. 9, 2020, which claims the priority benefit of China application no. 201911358921.4, filed on Dec. 25, 2019. The entirety of each of the above mentioned patent applications is hereby incorporated by reference herein and made a part of this specification.

BACKGROUND

Technical Field

The present invention belongs to the field of industrial wastewater treatment technologies, and particularly relates to a process and device for continuous treatment of high-concentration organic wastewater.

With the rapid development of China's economy and industrialization, more and more industrial wastewater is discharged into the natural environment, which contains part of high-concentration organic wastewater difficult to treat. The chemical oxygen demand (COD) of these high-concentration organic wastewater is usually above 20,000 mg/L, and the COD of part of the wastewater can reach hundreds of thousands of mg/L. Moreover, it has complex compositions, strong color, strong odor and serious environmental pollution. Therefore, the treatment of the high-concentration organic wastewater has become an inevitable demand in today's society.

Wastewater treatment processes mainly include a physical treatment method, a biodegradation method and a chemical oxidation method. The physical treatment method uses physical action to separate insoluble substances in wastewater, and its chemical properties do not change. This treatment method is suitable for industrial wastewater with relatively low concentration. The biological method is a method of decomposing organic matter into stable inorganic components by using the action of microorganisms. It has the characteristics of strong economy, high safety, less residue and the like. However, it has a long treatment cycle, a limited biological treatment capacity, and a large occupied area, so that difficultly treating part of higher-concentration industrial wastewater. The chemical oxidation method is a high-concentration organic wastewater treatment technology universally applied currently. There are two main treatment technologies currently applied: one is a treatment method with a strong oxidant at a room temperature, the cost of this technology is mainly consumption of the oxidant, the consumption of the oxidant is basically proportional to the concentration of the organic wastewater, and the cost of treating the high-concentration organic wastewater is relatively high; and the other method is a thermal incineration method, this method usually drives the high-concentration organic wastewater into an incinerator for combustion, this method usually requires a high temperature above 800° C., and requires mixing of part of fuels for combustion, a flash explosion phenomenon may occur in the incineration process, which is not conducive to wastewater treatment, and nitrogen oxides are easy to produce, which pollutes the environment. Therefore, it is urgent to further develop processes and devices for continuous treatment of high-concentration organic wastewater.

SUMMARY

In order to overcome shortcomings in prior art, the present invention provides a process and device for continuous treatment of high-concentration organic wastewater with a simple, efficient and stable process flow.

The process for continuous treatment of high-concentration organic wastewater is characterized by including the following steps.

Step 1, separation of high-concentration organic wastewater: under transport of a feeding pump, high-concentration organic wastewater enters a multilayer evaporator through a liquid flowmeter for evaporation and separation, so that organic light components and water in high-concentration organic wastewater are vaporized to form wastewater steam containing light components, the generated wastewater steam containing the light components is extracted from a heat pump through a top outlet of the multilayer evaporator, and heavy components of the multilayer evaporated wastewater is discharged from a second valve through a bottom outlet of the multilayer evaporator.

Step 2, purification of the wastewater steam containing the light components: after sequentially flowing through a cold fluid channel of a heat exchanger and a first preheater to be heated, the wastewater steam containing the light components is introduced into a first desulfurizer together with air for a desulfurization reaction, desulfurized tail gas is discharged from a bottom of the first desulfurizer and enters a first catalytic combustor for a purification reaction, and after flowing into a hot fluid channel of the heat exchanger for heat exchange, purified high-temperature steam heats the multilayer evaporator as a heat source, and is discharged as purified water after heat exchange and condensation.

Step 3, regeneration of a desulfurizing agent and a catalyst: after the desulfurizing agent in the first desulfurizer and the catalyst in the first catalytic combustor are deactivated, the generated wastewater steam containing the light components is switched to a second reaction route, namely entering a second desulfurizer at first together with air for a desulfurization reaction, and then entering a second catalytic combustor for a purification reaction, and purified high-temperature steam heats the multilayer evaporator as a heat source after passing through a hot fluid channel of the heat exchanger; and air is respectively introduced into the first desulfurizer and the first catalytic combustor for regeneration and activation at 500-600° C., and regenerated tail gas discharged from the first desulfurizer and the first catalytic combustor is merged and concentratedly purified.

The process for continuous treatment of high-concentration organic wastewater is characterized in that the vacuum in the multilayer evaporator is maintained by operation of the heat pump, and an absolute pressure for evaporation and separation in the multilayer evaporator is 80-100 kPa.

The process for continuous treatment of high-concentration organic wastewater is characterized in that the first preheater performs heating by electric heating or electromagnetic heating with a heating temperature of 200-400° C.

The process for continuous treatment of high-concentration organic wastewater is characterized in that the first desulfurizer or the second desulfurizer performs heating by electric heating or electromagnetic heating, the temperature for the desulfurization reaction is 200-400° C., and the internally filled desulfurizing agent thereof is zinc oxide, magnesium oxide, ferric oxide or calcium oxide.

The process for continuous treatment of high-concentration organic wastewater is characterized in that the first catalytic combustor or the second catalytic combustor performs heating by electric heating or electromagnetic heating, the temperature for the purification reaction is 200-400° C., and the internally filled catalyst thereof is a platinum alumina catalyst, a platinum rare earth catalyst, a platinum silica catalyst or a platinum barium sulfate catalyst.

The device used by the process for continuous treatment of high-concentration organic wastewater is characterized in that the device includes a feeding pump, a liquid flowmeter, a multilayer evaporator, a heat pump, a heat exchanger, a first preheater, a first desulfurizer and a second desulfurizer being parallelly arranged, as well as a first catalytic combustor and a second catalytic combustor being parallelly arranged; an upper inlet of the multilayer evaporator is connected with the feeding pump through the liquid flowmeter by pipelines, a top outlet of the multilayer evaporator is connected with an inlet of the first preheater through the heat pump and a cold fluid channel of the heat exchanger by pipelines, an outlet of the first preheater is divided into two paths, one path is connected with a top of the first desulfurizer through a fifth valve by pipelines, and the other path is connected with a top of the second desulfurizer through a sixth valve by pipelines; a bottom outlet of the first desulfurizer is divided into two paths, one path discharges the regenerated tail gas through an eighth valve, and the other path is connected with a top of the first catalytic combustor through a seventh valve by pipelines; a bottom outlet of the second desulfurizer is divided into two paths, one path discharges the regenerated tail gas through a ninth valve, and the other path is connected with a top of the second catalytic combustor through a tenth valve by pipelines; an inlet of a hot fluid channel of the heat exchanger is divided into two paths, one path is connected with a bottom outlet of the first catalytic combustor through an eleventh valve by pipelines, the other path is connected with a bottom outlet of the second catalytic combustor through a fourteenth valve by pipelines, and high-temperature steam outflowing from an outlet of the hot fluid channel of the heat exchanger is used as a heat source to heat the multilayer evaporator; a pipeline between the bottom outlet of the first catalytic combustor and the eleventh valve is further connected with a first branch pipe in a through manner, and a twelfth valve is arranged on the first branch pipe; and a pipeline between the bottom outlet of the second catalytic combustor and the fourteenth valve is further connected with a second branch pipe in a through manner, and a thirteenth valve is arranged on the second branch pipe.

The device used by the process for continuous treatment of high-concentration organic wastewater is characterized in that the device further includes a second preheater, air is introduced into an inlet end of the second preheater, and an outlet of the second preheater is divided into four paths, which are respectively connected with a top inlet of the first catalytic combustor, a top inlet of the first desulfurizer, a top inlet of the second desulfurizer and a top inlet of the second catalytic combustor through a fifteenth valve, a sixteenth valve, a seventeenth valve and an eighteenth valve by pipelines.

The device used by the process for continuous treatment of high-concentration organic wastewater is characterized in that multiple layers of evaporation heating trays are arranged in the multilayer evaporator from top to bottom, heating pipes in the multiple layers of evaporation heating trays in the multilayer evaporator 4 are all U-shaped heating pipes, and the number of layers of the evaporation heating trays is 4-10.

The device used by the process for continuous treatment of high-concentration organic wastewater is characterized in that the number of layers of the evaporation heating trays in the multilayer evaporator is marked as n; the outlet of the hot fluid channel of the heat exchanger is connected with a fourth valve and a third valve by a pipeline, and a pipeline between the fourth valve and the third valve is connected with n−1 branch liquid pipes in a through manner; from top to bottom, the n−1 branch liquid pipes are respectively connected with the heating pipes in the first n−1 layers of evaporation heating trays by pipelines, so that the high-temperature steam outflowing from the heat exchanger is divided into n−1 parts on average, and respectively introduced into the heating pipes in the first n−1 layers of evaporation heating trays for heating; and fresh water steam is introduced into the heating pipe in the n layer of evaporation heating tray for heating.

The invention has the beneficial effects as follows.

1) The present invention can efficiently separate high-concentration organic wastewater by adopting a multilayer evaporation technology (namely removing organic light components and most of water wherein), wastewater steam containing light components generated after separation can be directly transported through a heat pump to enter subsequent devices in a gas phase form for reaction, avoiding condensation of the wastewater steam and regasification of the wastewater, at the same time, newly generated wastewater steam and purified high-temperature steam are subjected to counter-current heat exchange, and the purified high-temperature steam is used as a heat source for heating a multilayer evaporator, which greatly reduces energy consumption.

2) The present invention adopts a high-temperature desulfurization technology for desulfurization, the sulfur content of the wastewater can meet the first-level discharge standard of industrial wastewater, at the same time, metal oxide desulfurizing agents can also remove 50% COD of the wastewater steam containing the light components; and by adopting a catalytic combustion technology, the COD of the high-concentration organic wastewater can be efficiently reduced, at the same time, the combustion temperature of organic matter can be reduced, which reduces the energy consumption, and after purification treatment, the COD of the wastewater can meet the third-level discharge standard. Organic combination of the high-temperature desulfurization technology and the catalytic combustion technology can avoid sulfur poisoning of catalysts, so that the catalysts can maintain catalytic activity.

3) The present invention adopts an in-situ regeneration manner of the desulfurizing agents and the catalysts, which ensures continuous and stable operation of a device.

4) The present invention has advantages of a simple, efficient, stable and continuous process flow and the like compared with currently commonly used biodegradation and direct combustion methods.

BRIEF DESCRIPTION OF THE DRAWINGS

FIG. 1 is a device for continuous treatment of high-concentration organic wastewater of the present application.

In FIG. 1: 1—Feeding pump, 21—First valve, 22—Second valve, 23—Third valve, 24—Fourth valve, 25—Fifth valve, 26—Sixth valve, 27—Seventh valve, 28—Eighth valve, 29—Ninth valve, 210—Tenth valve, 211—Eleventh valve, 212—Twelfth valve, 213—Thirteenth valve, 214—Fourteenth valve, 215—Fifteenth valve, 216—Sixteenth valve, 217—Seventeenth valve, 218—Eighteenth valve, 3—Liquid flowmeter, 4—Multilayer evaporator, 5—Heat pump, 6—Heat exchanger, 7—First preheater, 8—First desulfurizer, 9—First catalytic combustor, 10—Second desulfurizer, 11—Second catalytic combustor, 12—Second preheater.

DESCRIPTION OF THE EMBODIMENTS

The present invention is further expounded below in combination with specific embodiments, but the scope of protection of the present invention is not limited to this.

Embodiments: By Contrasting FIG. 1

A device for continuous treatment of high-concentration organic wastewater includes a feeding pump 1, a liquid flowmeter 3, a multilayer evaporator 4, a heat pump 5, a heat exchanger 6, a first preheater 7, a first desulfurizer 8 and a second desulfurizer 10 being parallelly arranged, as well as a first catalytic combustor 9 and a second catalytic combustor 11 being parallelly arranged.

The high-concentration organic wastewater is introduced into an inlet of the feeding pump 1, and an outlet of the feeding pump 1 is connected with an upper inlet of the multilayer evaporator 4 through the first valve 21 and the liquid flowmeter 3 by pipelines. A top outlet of the multilayer evaporator 4 is connected with an inlet of the first preheater 7 through the heat pump 5 and a cold fluid channel of the heat exchanger 6 by pipelines. An outlet of the first preheater 7 is divided into two paths, one path is connected with a top of the first desulfurizer 8 through a fifth valve 25 by pipelines, and the other path is connected with a top of the second desulfurizer 10 through a sixth valve 26 by pipelines. In a practical application process, the first desulfurizer 8 and the second desulfurizer 10 alternately conduct a desulfurization reaction and regeneration. When one is in a reaction state for removing sulfur-containing compounds in wastewater steam containing light components, air is introduced into the other for heat regeneration.

A bottom outlet of the first desulfurizer 8 is divided into two paths, one path discharges regenerated tail gas through an eighth valve 28, and the other path is connected with a top of the first catalytic combustor 9 through a seventh valve 27 by pipelines; and a bottom outlet of the second desulfurizer 10 is divided into two paths, one path discharges regenerated tail gas through a ninth valve 29, and the other path is connected with the second catalytic combustor 11 through a tenth valve 210 by pipelines. In a practical application process, the first catalytic combustor 9 and the second catalytic combustor 11 alternately conduct a catalytic combustion reaction and regeneration. When one is in a reaction state for removing organic matter in the wastewater steam containing the light components, the air is introduced into the other for heat regeneration.

An inlet of a hot fluid channel of the heat exchanger 6 is divided into two paths, one path is connected with a bottom outlet of the first catalytic combustor 9 through an eleventh valve 211 by pipelines, the other path is connected with a bottom outlet of the second catalytic combustor 11 through a fourteenth valve 214 by pipelines, and high-temperature steam outflowing from an outlet of the hot fluid channel of the heat exchanger 6 is used as a heat source to heat the multilayer evaporator 4; a pipeline between the bottom outlet of the first catalytic combustor 9 and the eleventh valve 211 is further connected with a first branch pipe in a through manner, and a twelfth valve 212 is arranged on the first branch pipe; and a pipeline between the bottom outlet of the second catalytic combustor 11 and the fourteenth valve 214 is further connected with a second branch pipe in a through manner, and a thirteenth valve 213 is arranged on the second branch pipe.

By contrasting FIG. 1, the device of the present application further includes a second preheater 12, air is introduced into an inlet end of the second preheater 12, and an outlet of the second preheater 12 is divided into four paths, which are respectively connected with a top inlet of the first catalytic combustor 9, a top inlet of the first desulfurizer 8, a top inlet of the second desulfurizer 10 and a top inlet of the second catalytic combustor 11 through a fifteenth valve 215, a sixteenth valve 216, a seventeenth valve 217 and an eighteenth valve 218 by pipelines, so as to respectively introducing hot air preheated by the second preheater 12.

In the present application, multiple layers of evaporation heating trays are arranged in the multilayer evaporator 4 from top to bottom. Heating pipes in the multiple layers of evaporation heating trays in the multilayer evaporator 4 are all U-shaped heating pipes. The number of layers of the evaporation heating trays is 4-10.

In an initial operation stage of the device, fresh water steam is used as a heat source for heating the multilayer evaporator 4. After the device is stable in operation, in order to recover heat of the high-temperature steam outflowing from the outlet of the hot fluid channel of the heat exchanger 6, the following design method is adopted: the number of layers of the evaporation heating trays in the multilayer evaporator 4 is marked as n; the outlet of the hot fluid channel of the heat exchanger 6 is connected with a fourth valve 24 and a third valve 23 by a pipeline, and a pipeline between the fourth valve 24 and the third valve 23 is connected with n−1 branch liquid pipes in a through manner; from top to bottom, the n−1 branch liquid pipes are respectively connected with the heating pipes in the first n−1 layers of evaporation heating trays by pipelines, so that the high-temperature steam outflowing from the heat exchanger 6 is divided into n−1 parts on average, and respectively introduced into the heating pipes in the first n−1 layers of evaporation heating trays for heating; and the fresh water steam is introduced into the heating pipe in the n layer of evaporation heating tray for heating.

The process steps of continuous treatment of high-concentration organic wastewater by adopting the device of the present application are as follows.

Step 1, separation of high-concentration organic wastewater: under a transport action of the feeding pump 1, high-concentration organic wastewater enters the multilayer evaporator 4 sequentially through the first valve 21 and the liquid flowmeter 3 for evaporation and separation, so that organic light components and most of water in high-concentration organic wastewater are vaporized to form wastewater steam containing light components, the generated wastewater steam containing the light components is extracted from the heat pump 5 through the top outlet of the multilayer evaporator 4 (operation of the heat pump 5 makes the absolute pressure in the multilayer evaporator 4 maintain 80-100 kPa), and heavy components of the multilayer evaporated wastewater is discharged from a second valve 22 through a bottom outlet of the multilayer evaporator 4.

Step 2, purification of the wastewater steam containing the light components: after sequentially flowing through the cold fluid channel of the heat exchanger 6 and the first preheater 7 to be heated to 200-400° C. in two steps, the wastewater steam containing the light components is introduced into the first desulfurizer 8 through the fifth valve 25, at the same time, hot air preheated from the second preheater 12 is introduced into the first desulfurizer 8 through the sixteenth valve 216 for a desulfurization reaction, desulfurized tail gas is discharged from a bottom of the first desulfurizer 8 and enters the first catalytic combustor 9 through the seventh valve 27 for a purification reaction, and after flowing into the hot fluid channel of the heat exchanger 6 for heat exchange, purified high-temperature steam heats the multilayer evaporator 4 as a heat source, and is discharged as purified water after heat exchange and condensation.

Step 3, regeneration of a desulfurizing agent and a catalyst: after the desulfurizing agent in the first desulfurizer 8 and the catalyst in the first catalytic combustor 9 are deactivated, the generated wastewater steam containing the light components is switched to a second reaction route, namely opening the sixth valve 26 and closing the fifth valve 25 to control the wastewater steam containing the light components to enter the second desulfurizer 10 at first for a desulfurization reaction, then opening the tenth valve 210 and closing the ninth valve 29 to control desulfurized reaction gas to enter the second catalytic combustor 11 for a purification reaction, and purified high-temperature steam heats the multilayer evaporator 4 as a heat source after passing through the hot fluid channel of the heat exchanger 6.

At the same time, in the regeneration process of the desulfurizing agent and the catalyst of the above step 3, due to closing of the eighteenth valve 218 and opening of the fifteenth valve 215, the sixteenth valve 216 and the seventeenth valve 217, three parts of preheated hot air are discharged through the second preheater 12, wherein two parts of the hot air are used for regeneration of the desulfurizing agent and the catalyst, namely being respectively introduced into the first desulfurizer 8 and the first catalytic combustor 9 for regeneration and activation at a temperature of 500-600° C., at this time, the seventh valve 27 connected to the bottom outlet of the first desulfurizer 8 in a through manner and the eleventh valve 211 connected to the bottom outlet of the first catalytic combustor 9 in a through manner are both closed, the bottom outlet of the first desulfurizer 8 discharges regenerated tail gas through the eighth valve 28, the bottom outlet of the first catalytic combustor 9 discharges regenerated tail gas through the twelfth valve 212, and the regenerated tail gas discharged from the first desulfurizer 8 and the first catalytic combustor 9 can be merged and concentratedly purified, for example, the regenerated tail gas is absorbed by an absorption liquid. The third part of hot air discharged from the second preheater 12 sequentially flows through the second desulfurizer 10 and the second catalytic combustor 11 for reaction.

Embodiment 1

According to a device shown in FIG. 1, a process for continuous treatment of high-concentration organic wastewater.

First, a first desulfurizer 8 and a second desulfurizer 10 are both filled with a zinc oxide desulfurizer, and a first catalytic combustor 9 and a second catalytic combustor 11 are both filled with a platinum alumina catalyst, with a composition of 0.5 wt % $Pt/Al_2O_3$.

Temperatures of a first preheater 7, a second preheater 12, the first desulfurizer 8 and the first catalytic combustor 9 are all raised to 300° C. in an electrical heating manner, firstly, fresh water steam is used as a heat source to heat a multilayer evaporator 4, and a heat pump 5 is turned on to make the absolute pressure in the multilayer evaporator 4 be 85 kPa. After the device is stable, through transport of a feeding pump 1, biodiesel production wastewater enters the multilayer evaporator 4 sequentially through a first valve 21 and a liquid flowmeter 3 for evaporation and separation. Generated 95° C. wastewater steam containing light components is extracted and transported from a top outlet of the multilayer evaporator 4 by the heat pump 5, and inlet into the first desulfurizer 8 through a fifth valve 25 after being heated to 300° C. through a cold fluid channel of a heat exchanger 6 and a preheater 7 in two steps. At the same time, hot air preheated from the second preheater 12 is introduced into the first desulfurizer 8 through a sixteenth valve 216 for a desulfurization reaction. Desulfurized tail gas is discharged from a bottom of the first desulfurizer 8 and enters the first catalytic combustor 9 through a seventh valve 27 for a purification reaction. Purified 300° C. high-temperature steam is discharged from a bottom of the first catalytic combustor 9 and enters a hot fluid channel of the heat exchanger 6 through an eleventh valve 211. The purified 300° C. high-temperature steam and the 95° C. wastewater steam containing the light components are subjected to heat exchange in the heat exchanger 6. After heat exchange, the temperature of the wastewater steam containing the light components outflowing from the cold fluid channel of the heat exchanger 6 is raised to 250° C., and the temperature of the high-temperature steam outflowing from the hot fluid channel of the heat exchanger 6 is reduced to 145° C. The 145° C. steam outflowing from the hot fluid channel of the heat exchanger 6 is used as a heat source to heat the multilayer evaporator 4, and is discharged as purified water after heat exchange and condensation. After the device is stable in operation, only 145° C. fresh water steam is used to heat a last layer of evaporation heating tray of the multilayer evaporator 4; and other evaporation heating trays of the multilayer evaporator 4 are heated by adopting the 145° C. steam outflowing from the hot fluid channel of the heat exchanger 6 as the heat source. Heavy components of the multilayer evaporated wastewater are discharged from a second valve 22 through a bottom outlet of the multilayer evaporator 4, and can be recycled.

After a desulfurizing agent in the first desulfurizer 8 and a catalyst in the first catalytic combustor 9 are deactivated, the fifth valve 25, the seventh valve 27 and the eleventh valve 211 are closed, and a sixth valve 26, a tenth valve 210, a fourteenth valve 214, a fifteenth valve 215, a sixteenth valve 216 and a seventeenth valve 217 are opened. Three parts of preheated hot air are discharged from the second preheater 12, wherein the two parts of hot air are used for regeneration of the desulfurizing agent and the catalyst, and the third part of hot air is used for reaction. The wastewater steam containing the light components and the third part of hot air discharged from the second preheater 12 firstly enter the second desulfurizer 10 together for a desulfurization reaction, and then enter the second catalytic combustor 11 for a purification reaction. The two parts of hot air, discharged by the second preheater 12, for regeneration are respectively introduced into the first desulfurizer 8 and the first catalytic combustor 9 for regeneration and activation at 550° C. Regenerated tail gas is discharged in a combination manner after passing through an eighth valve 28 and a twelfth valve 212 respectively, and then is concentratedly purified to realize continuous operation of the device.

After treatment, the chemical oxygen demand (COD) of the biodiesel production wastewater can be reduced from initial 200,000 mg/L to below 500 mg/L, and the removal rate reaches above 99.75%, meeting the third-level discharge standard of industrial wastewater; and the sulfur content of the wastewater is reduced to below 1 mg/L, meeting the first-level discharge standard of industrial wastewater.

Embodiment 2

According to a device shown in FIG. 1, operation steps of a process for continuous treatment of high-concentration organic wastewater are repeated as Embodiment 1, and differences lie in the following two points.

First, desulfurizing agents of a first desulfurizer 8 and a second desulfurizer 10 are both replaced with a ferric oxide desulfurizing agent.

Secondly, a wastewater raw material is replaced with oil epoxy reaction wastewater with the initial chemical oxygen demand of about 5,000 mg/L (namely wastewater generated after an epoxy reaction of biodiesel, formic acid and hydrogen peroxide), and the other operation steps are the same as Embodiment 1.

After treatment, the chemical oxygen demand (COD) of the oil epoxy reaction wastewater can be reduced from initial 5,000 mg/L to below 50 mg/L, and the removal rate reaches above 99%, meeting the first-level discharge standard of industrial wastewater; and the sulfur content of the wastewater is reduced to below 1 mg/L, meeting the first-level discharge standard of industrial wastewater.

The content described in the present specification is only an enumeration of realization forms of the invention concept, and the scope of protection of the present invention should not be regarded as limited to the specific forms stated in the embodiments.

What is claimed is:

1. A process for continuous treatment of high-concentration organic wastewater, comprising the following steps:
    step 1, separation of high-concentration organic wastewater: transporting high-concentration organic wastewater to a multilayer evaporator (4) by utilizing a feeding pump (1), wherein the high-concentration organic wastewater passes through a liquid flowmeter (3); evaporating and separating the high-concentration organic wastewater to vaporize organic light components and water in high-concentration organic wastewater to form wastewater steam containing light components by utilizing the multilayer evaporator (4); extracting the generated wastewater steam containing the light components from a heat pump (5) through a top outlet of the multilayer evaporator (4); and discharging heavy components of the multilayer evaporated wastewater from a second valve (22) through a bottom outlet of the multilayer evaporator (4);
    step 2, purification of the wastewater steam containing the light components: sequentially flowing the wastewater steam containing the light components through a cold fluid channel of a heat exchanger (6) and a first preheater (7) to heat the wastewater steam containing the light components; introducing the wastewater steam containing the light components into a first desulfurizer (8) together with air; performing a first desulfurization reaction on the wastewater steam containing the light components in present of air to form a first desulfurized tail gas; discharging the first desulfurized tail gas from a bottom of the first desulfurizer (8) and flowing the first desulfurized tail gas into a first catalytic combustor (9); performing a purification reaction on the first desulfurized tail gas to form a first purified high-temperature steam; and flowing the first purified high-temperature steam into a hot fluid channel of the heat exchanger (6) for heat exchange, wherein the first purified high-temperature steam heats the multilayer evaporator (4) as a heat source, and is discharged as purified water after heat exchange and condensation; and
    step 3, regeneration of a desulfurizing agent included in the first desulfurizer (8) and a catalyst included in the first catalytic combustor (9): switching the wastewater steam containing the light components to a second reaction route after the desulfurizing agent in the first desulfurizer (8) and the catalyst in the first catalytic combustor (9) are deactivated; flowing the wastewater steam containing the light components into a second desulfurizer (10) at first together with air; performing a second desulfurization reaction on the wastewater steam containing the light components in present of air to form a second desulfurized tail gas; flowing the second desulfurized tail gas into a second catalytic combustor (11); performing a purification reaction on the second desulfurized tail gas to form a second purified high-temperature steam; flowing the second purified high-temperature steam into the hot fluid channel of the heat exchanger (6), wherein the second purified high-temperature steam heats the multilayer evaporator (4) as a heat source; and introducing air into the first desulfurizer (8) and the first catalytic combustor (9) respectively for regeneration and activation of the desulfurizing agent and the catalyst at 500-600° C. and forming a regenerated tail gas, and the regenerated tail gas discharged from the first desulfurizer (8) and the first catalytic combustor (9) is merged and purified centralizedly.

2. The process for continuous treatment of high-concentration organic wastewater as claimed in claim 1, wherein the vacuum in the multilayer evaporator (4) is maintained by operation of the heat pump (5), and the absolute pressure for evaporation and separation in the multilayer evaporator (4) is 80-100 kPa.

3. The process for continuous treatment of high-concentration organic wastewater as claimed in claim 1, wherein the first preheater (7) performs heating by electric heating or electromagnetic heating with a heating temperature of 200-400° C.

4. The process for continuous treatment of high-concentration organic wastewater as claimed in claim 1, wherein the first desulfurizer (8) or the second desulfurizer (10) performs heating by electric heating or electromagnetic heating, the temperature for the desulfurization reaction is 200-400° C., and the desulfurizing agent filled in the first desulfurizer (8) and the second desulfurizer (10) is zinc oxide, magnesium oxide, ferric oxide or calcium oxide.

5. The process for continuous treatment of high-concentration organic wastewater as claimed in claim 1, wherein the first catalytic combustor (9) or the second catalytic combustor (11) performs heating by electric heating or electromagnetic heating, the temperature for the purification reaction is 200-400° C., and the catalyst filled in the first catalytic combustor (9) and the second catalytic combustor (11) is a platinum alumina catalyst, a platinum rare earth catalyst, a platinum silica catalyst or a platinum barium sulfate catalyst.

6. A device used by the process for continuous treatment of high-concentration organic wastewater as claimed in claim 1, wherein the device includes the feeding pump (1), the liquid flowmeter (3), the multilayer evaporator (4), the heat pump (5), the heat exchanger (6), the first preheater (7), the first desulfurizer (8), the first catalytic combustor (9), the second desulfurizer (10) and the second catalytic combustor (11), wherein the first desulfurizer (8) and the second desulfurizer (10) are arranged in parallel, and the first catalytic combustor (9) and the second catalytic combustor (11) are arranged in parallel;

an upper inlet of the multilayer evaporator (4) is connected with the feeding pump (1) through the liquid flowmeter (3) by pipelines, the top outlet of the multilayer evaporator (4) is connected with an inlet of the first preheater (7) through the heat pump (5) and a cold fluid channel of the heat exchanger (6) by pipelines;

an outlet of the first preheater (7) is divided into two paths, one path of the outlet of the first preheater (7) is connected with a top of the first desulfurizer (8) through a fifth valve (25) by pipelines, and the other path of the outlet of the first preheater (7) is connected with a top of the second desulfurizer (10) through a sixth valve (26) by pipelines;

a bottom outlet of the first desulfurizer (8) is divided into two paths, one path of the bottom outlet of the first desulfurizer (8) discharges the regenerated tail gas through an eighth valve (28), and the other path of the bottom outlet of the first desulfurizer (8) is connected with a top of the first catalytic combustor (9) through a seventh valve (27) by pipelines;

a bottom outlet of the second desulfurizer (10) is divided into two paths, one path of the bottom outlet of the second desulfurizer (10) discharges the regenerated tail gas through a ninth valve (29), and the other path of the bottom outlet of the second desulfurizer (10) is connected with a top of the second catalytic combustor (11) through a tenth valve (210) by pipelines;

an inlet of a hot fluid channel of the heat exchanger (6) is divided into two paths, one path of the inlet of the hot fluid channel of the heat exchanger (6) is connected with a bottom outlet of the first catalytic combustor (9) through an eleventh valve (211) by pipelines, the other path of the inlet of the hot fluid channel of the heat exchanger (6) is connected with a bottom outlet of the second catalytic combustor (11) through a fourteenth valve (214) by pipelines, and high-temperature steam outflowing from an outlet of the hot fluid channel of the heat exchanger (6) is used as a heat source to heat the multilayer evaporator (4); and a pipeline between the bottom outlet of the first catalytic combustor (9) and the eleventh valve (211) is further connected with a first branch pipe in a through manner, and a twelfth valve (212) is arranged on the first branch pipe; and a pipeline between the bottom outlet of the second catalytic combustor (11) and the fourteenth valve (214) is further connected with a second branch pipe in a through manner, and a thirteenth valve (213) is arranged on the second branch pipe.

7. The device used by the process for continuous treatment of high-concentration organic wastewater as claimed in claim 6, wherein the device further includes a second preheater (12), air is introduced into an inlet end of the second preheater (12), and an outlet of the second preheater (12) is divided into four paths, which are respectively connected with a top inlet of the first catalytic combustor (9), a top inlet of the first desulfurizer (8), a top inlet of the second desulfurizer (10) and a top inlet of the second catalytic combustor (11) through a fifteenth valve (215), a sixteenth valve (216), a seventeenth valve (217) and an eighteenth valve (218) by pipelines.

8. The device used by the process for continuous treatment of high-concentration organic wastewater as claimed in claim 6, wherein multiple layers of evaporation heating trays are arranged in the multilayer evaporator (4) from top to bottom, heating pipes in the multiple layers of evaporation heating trays in the multilayer evaporator (4) are all U-shaped heating pipes, and the number of layers of the evaporation heating trays is 4-10.

9. The device used by the process for continuous treatment of high-concentration organic wastewater as claimed in claim 6, wherein the number of layers of the evaporation heating trays in the multilayer evaporator (4) is marked as n; the outlet of the hot fluid channel of the heat exchanger (6) is connected with a fourth valve (24) and a third valve (23) by a pipeline, and a pipeline between the fourth valve (24) and the third valve (23) is connected with n−1 branch liquid pipes in a through manner; from top to bottom, the n−1 branch liquid pipes are respectively connected with the heating pipes in the first n−1 layers of evaporation heating trays by pipelines, so that the high-temperature steam outflowing from the heat exchanger (6) is divided into n−1 parts on average, and respectively introduced into the heating pipes in the first n−1 layers of evaporation heating trays for heating; and fresh water steam is introduced into the heating pipe in the n layer of evaporation heating tray for heating.

\* \* \* \* \*

UNITED STATES PATENT AND TRADEMARK OFFICE
CERTIFICATE OF CORRECTION

Page 1 of 1

PATENT NO. : 11,767,232 B2
APPLICATION NO. : 17/367642
DATED : September 26, 2023
INVENTOR(S) : Yong Nie et al.

It is certified that error appears in the above-identified patent and that said Letters Patent is hereby corrected as shown below:

On the Title Page

Item (30) Foreign Application Priority Data should read:
December 25, 2019 (CN) ......201911358921.4

Signed and Sealed this
Fourteenth Day of November, 2023

Katherine Kelly Vidal
*Director of the United States Patent and Trademark Office*